March 11, 1952 — A. H. STOCKMAR — 2,588,585
FRANGIBLE FRAME ALL-PURPOSE FARM IMPLEMENT
Filed Sept. 5, 1946 — 2 SHEETS—SHEET 1
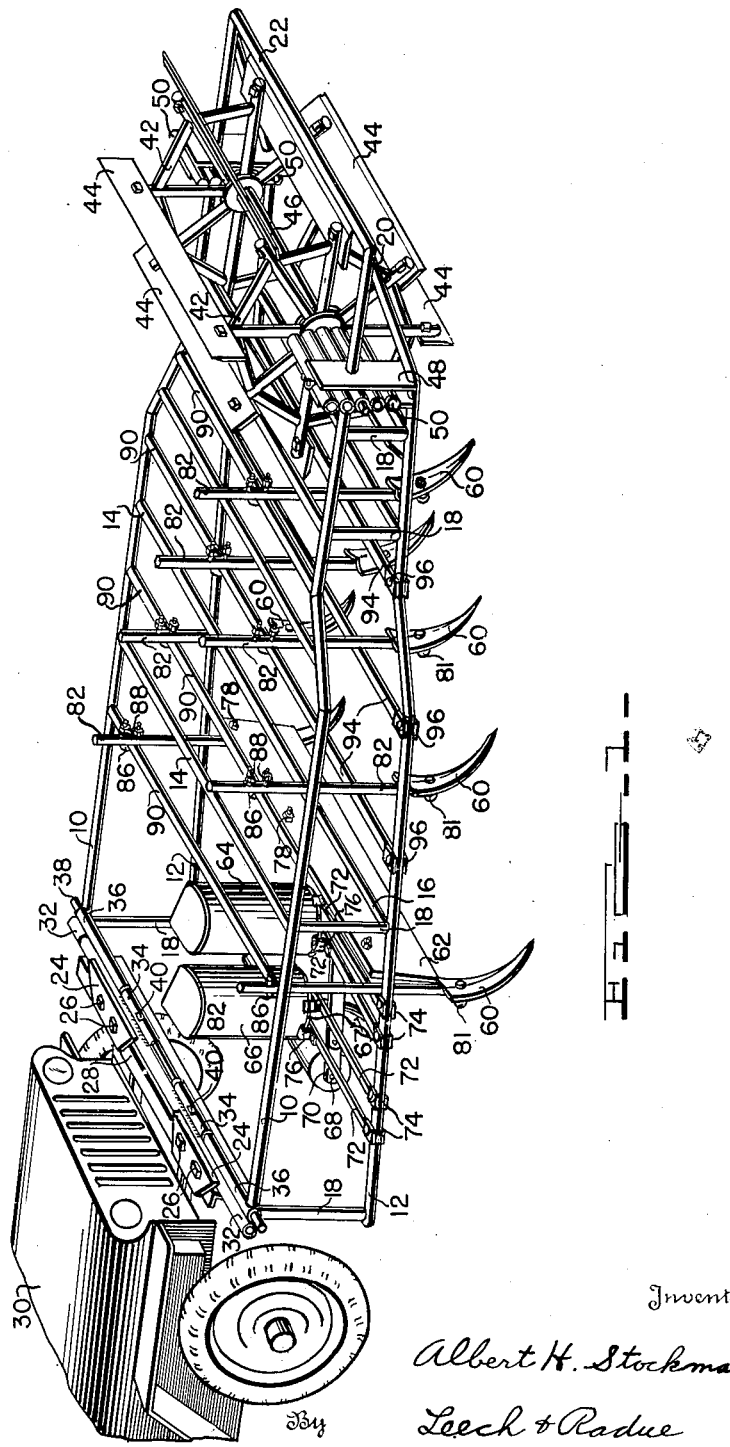
Inventor
Albert H. Stockmar
By Leech & Radue
Attorneys March 11, 1952 — A. H. STOCKMAR — 2,588,585
FRANGIBLE FRAME ALL-PURPOSE FARM IMPLEMENT
Filed Sept. 5, 1946 — 2 SHEETS—SHEET 2
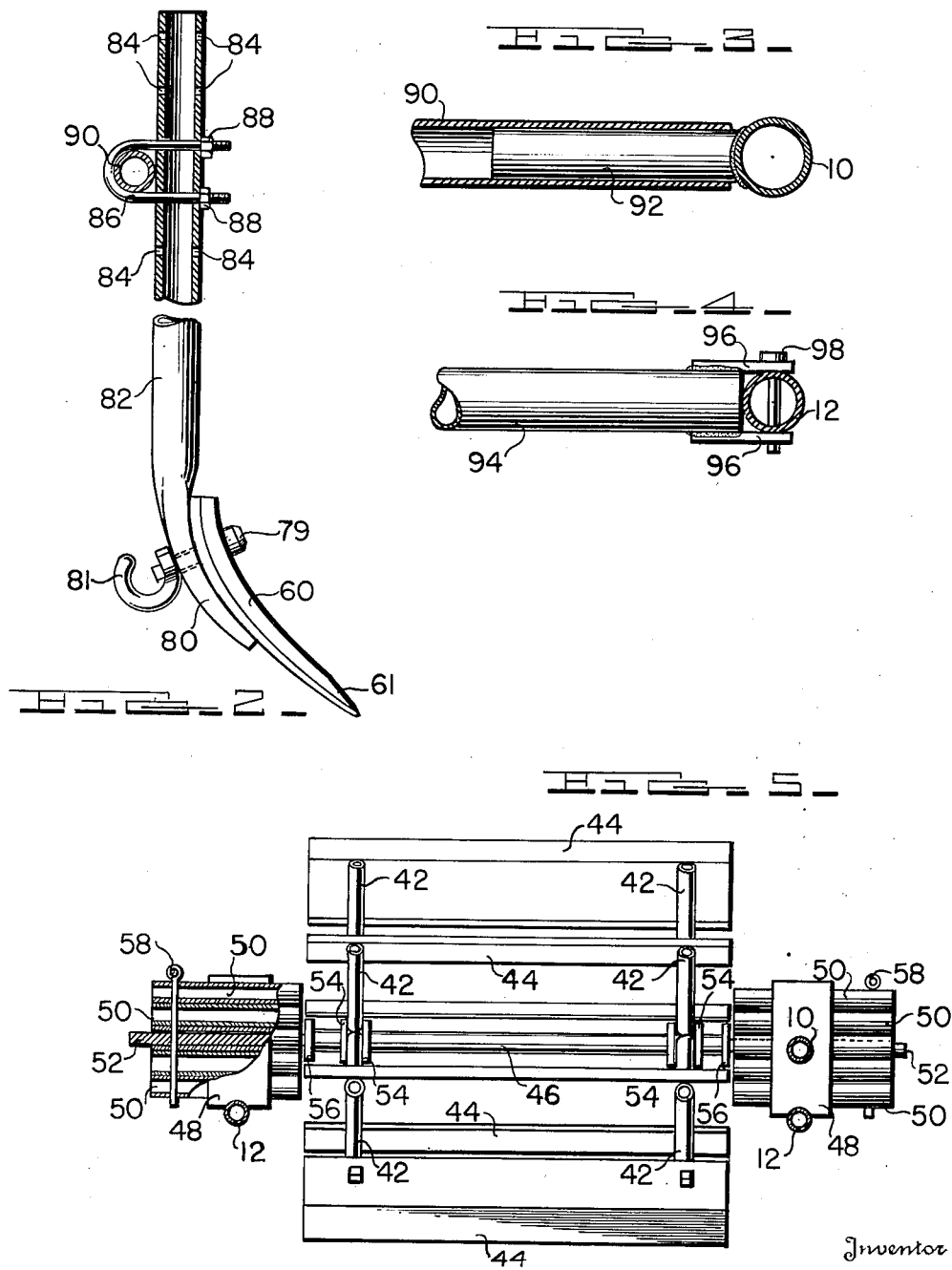

Patented Mar. 11, 1952

2,588,585

UNITED STATES PATENT OFFICE 2,588,585

FRANGIBLE FRAME ALL-PURPOSE FARM IMPLEMENT

Albert H. Stockmar, Villa Rica, Ga.

Application September 5, 1946, Serial No. 694,956

3 Claims. (Cl. 97—185)

The present invention relates generally to the agricultural machinery art.

More particularly this invention pertains to certain new and useful improvements in agricultural machines of the composite type wherein a plurality of earth-working and related implements are mounted upon a unitary frame which is adapted to be pushed over the ground by a prime mover such, for example. as a jeep.

The principal object of the present invention is to provide a composite agricultural machine which is capable in a single operation of performing a plurality of related functions such as cutting stalks. listing beds, leveling beds, planting seed and placing fertilizer.

Another important object of the invention is to provide a composite agricultural machine of the type described wherein the supporting frame is constructed substantially entirely of welded metal tubing which may be relatively inexpensively produced and which will require a minimum of maintenance attention in operation.

A further object of the invention is to provide a composite agricultural machine of the type described wherein the frame is pivotally mounted at its rear end upon the front of a prime mover and has its front end supported out of contact with the ground by means of a rotatable element which also performs a useful function as one of the agricultural implements of the assembly.

An additional object of the invention is to provide a composite agricultural machine which includes improved bearing structures at its front end in which a rotatable ground contacting implement may be adjustably mounted for supporting the frame out of contact with the ground.

A still further object of the invention resides in the provision of an agricultural machine carrying a plurality of earth-working implements wherein a common frangible safety element is operatively associated with at least two of such implements for preventing damage to the machine.

The foregoing as well as other and further objects and advantages of the invention together with a clearer understanding of the precise nature thereof will become more readily apparent to one skilled in the art from a consideration of the following detailed specification taken in conjunction with the accompanying drawings illustrating a preferred embodiment thereof wherein:

Fig. 1 is an over-all perspective view of a composite agricultural machine in accordance with the present invention showing the same attached in operative position to the front of a prime mover;

Fig. 2 is a side elevational view in partial cross section and to a larger scale of one of the earth-working implements shown in Fig. 1;

Fig. 3 is a cross-sectional view to an enlarged scale of one of the implement supports;

Fig. 4 is a fragmentary detail view in side elevation of the frangible connection constituting an important part of the invention, and Fig. 5 is a front elevational view in partial cross section of the rotatable frame supporting implement and adjustable bearing structure constituting another important feature of the invention.

Referring now in somewhat more detail to the drawings and in particular to Fig. 1 thereof, the improved agricultural machine in accordance with the present invention is seen to comprise a frame having upper side rails 10 and lower side rails 12 interconnected by a plurality of upper crossbraces 14, lower crossbraces 16 and vertical braces 18. This frame is tapered forwardly in both the horizontal and vertical sense and is preferably constructed substantially entirely of welded steel or other suitable metal tubing. At the front end of the frame the lower side rails 12 are bent upwardly and joined to the upper side rails 10 at a point indicated by reference numeral 20, and a single horizontal crossbrace 22 is attached to the extreme front ends of the rails 10.

The frame is provided at its rear end with hinge means for attaching it to the front end of a prime mover in position to be pushed over the ground. As shown in Fig. 1, this hinge means comprises a pair of flat plates 24 which are adapted to be secured in any suitable manner as by means of a plurality of bolts 26 to the front end of a prime mover and in the present case are shown as being attached to the bumper 28 of a prime mover designated generally by reference numeral 30, and which may take the form of the well known army "jeep." A horizontal section of tubing 32 of approximately the same length as the width of the rearward portion of the frame is attached preferably by welding to the undersurface of each of the plates 24 and is provided with a pair of relatively shorter lengths of tubing 34 attached thereto as by means of welding or the like and extending forwardly therefrom. The upper side rails 10 of the frame are provided at their rear ends with a pair of short lengths of tubing 36 suitably secured to the frame in a horizontal position with their inner ends adjacent the outer ends of the tubing sections 34.

It is contemplated that a conventional mechanical lift operated by the power winch of a jeep, or other suitable power take-off means, will be used to elevate the frame about its hinge connection through a cable connected to the frame intermediate its length. A shaft 38 extends through each of the tubing sections 36 and 34 and is preferably secured to the latter as by means of a pair of bolts 40. The through shaft 38 together with the tubing sections 34 and 36 is thus seen to constitute a freely rotatable hinge connection between the frame and the front end of the prime mover 30.

The front end of the frame is supported out of contact with the ground by means of a rotatable implement which is shown in the present case as a stalk cutter comprising a reel 42 having a plurality of blades 44 attached to the outer periphery thereof and including a centrally located tubular hub 46. As previously indicated, it is an important feature of the invention that the rotatable element for supporting the front end of the frame also serves a useful function as an agricultural implement, and in order that this may be satisfactorily accomplished the height of the frame above the ground may be varied by adjusting the position of the stalk cutter relative thereto. As shown particularly in Figs. 1 and 5, an adjustable bearing assembly is provided at each side adjacent the front end of the frame, each assembly comprising a pair of spaced vertical plates 48 attached to the upper and lower side rails as by means of welding or the like and having a plurality of superimposed tubular bearings 50 mounted therebetween. An axle 52 extends through the tubular hub 46 of the reel 42 and may be selectively positioned in a pair of opposed bearings 50. The reel 42 is attached to the hub 46 by means of pairs of spaced collars 54, and a pair of freely rotatable washers 56 serve to space the ends of the hub 46 from its associated bearings 50. Elongated eye bolts 58 are adapted to extend through suitable apertures formed in each of the bearings 50 and adjacent the opposite ends of the axle 52 for securing the latter in position. Thus it will be understood that the hub 46 and its associated reel 42 and blades 44 are free to rotate about the axle 52 in any position of adjustment of the latter.

With further reference to Fig. 1, it will be noted that the frame which has been described carries a number of different agricultural implements each of which performs a specialized function. Although the functions of these various implements are different they are also closely related, not only by reason of the association of the implements themselves upon a single frame, but also by reason of the fact that the particular successive arrangement of the implements provides for a cooperative functional relationship therebetween. In other words, the specific arrangement of implements upon the frame is such that it is possible in a single operation to perform substantially all of the functions necessary to a complete planting operation. Specifically, there is mounted on the frame from front to rear, successively, a gang of plows having plowshares 60, a bed leveler 62, a fertilizer placer 64, a seed planter 66, and a bed roller 68, the latter being rotatably mounted at the free end of an arm 70 which is pivotally secured in any convenient manner to the frame. The seed planter 66 is provided with a depending spout 67 and the fertilizer placer 64 may be likewise equipped with a suitable outlet pipe (not shown). The bed leveler 62, fertilizer placer 64, and seed planter 66 are attached in any suitable manner to a plurality of adjustable crossbraces 72 which extend between the lower side rails 12 and are secured thereto in any suitable manner as by means of adjustable brackets 74. A plurality of clamps 76 are shown in Fig. 1 as attaching the fertilizer placer 64 and seed planter 66 to their respective crossbraces 72 by engagement with the bottom flanges of these implements, and a plurality of bolts 78 serve to connect the bed leveler 62 to its crossbrace 72.

The particular form of devices employed for mounting the earth-working implements on the frame of the machine is best illustrated in Figs. 1 to 4. As particularly shown in Fig. 2, each of the plowshares 60 is curved in a forward direction and tapered downwardly to a point 61. The upper curved portion of each plowshare is adapted to fit snugly into a similarly curved face provided upon the flattened lower portion 80 of a generally tubular standard 82. Suitable apertures are provided in the plowshares 60 and flattened portions 80 for the reception of through-bolts 79 adapted to be engaged at their opposite ends by curved locknuts 81 to firmly secure the plowshares to their respective standards. The upper portion of the standard 82 is provided with a plurality of diametrically opposed apertures 84 which are horizontally aligned in a fore-and-aft direction when the standards are in their operative position. The vertical distance between adjacent apertures 84 is suitably dimensioned to provide for the reception of the opposite arms of a U-bolt 86 having nuts 88 for securely clamping each standard 82 to one of a plurality of implement mounting beams 90 which extend between the upper side rails 10. It will be understood that the U-bolts 86 may be selectively positioned in different pairs of apertures 84, thus providing an initial adjustment of the plow depth of a relatively permanent character.

Referring now particularly to Fig. 3, it will be noted that each of the implement mounting beams 90 is of hollow tubular construction and is supported at its opposite ends upon stub shafts 92 each of which is welded at one end to one of the upper side rails 10. The implement supporting beams 90 are freely rotatable about the stub shafts 92 (only one such mounting being shown in Fig. 3), and it will thus be understood that the standards 82 carrying the plowshares 60 are likewise free to pivot, at least in a forward direction, about this same axis.

Opposing the rearward pivoting of the standards 82 are a plurality of tubular heel pipes 94 which extend between the lower side rails 12 in position to be abutted by the lower rear faces of the standards 82 when the latter are in a substantially vertical position. Each of the heel pipes 94 is provided at its outer ends with a pair of diametrically spaced, apertured ears 96 which are preferably welded to the ends of the pipes 94 with the apertured portions extending outwardly beyond the ends of the latter. The apertured portions of the ears 96 are adapted to extend respectively above and below similar apertures formed in the lower side rails 12, and a shear pin 98, preferably of soft steel or other suitable material, extends through these apertures for releasably securing the heel pipes 94 to the lower side rails 12. The shear pins 98 are so proportioned that they will break upon the application of a force which is insufficient to cause structural damage to the other portions of the frame or machine and which might be occasioned, for example, by the plowshares 60 striking a hidden rock or other obstruction.

It is to be particularly noted that each of the heel pipes 94, with the exception of the one at the front of the frame, is abutted by a plurality of standards 82 so that the frangible connection formed by each shear pin 98 will be broken to release its associated heel pipe 94 and permit free rearward swinging of the associated standards 82 in the event that any one of the plowshares 60 which are associated with that particular heel pipe should meet such an obstruction. That is to say, each frangible connection may be broken by the application of undue force to any one of a plurality of its associated standards 82.

Obviously numerous other modifications, alterations, and deviations from the specific structures disclosed herein as a preferred embodiment solely for purposes of illustration will occur to one skilled in the art without departing from the spirit or scope of the invention as set forth in the appended claims.

Having thus described my invention, what I claim as novel and desire to secure by Letters Patent of the United States is:

1. An agricultural machine comprising in combination, a frame, a plurality of standards adapted to carry earth-working implements at their lower ends, said standards being pivotally mounted in said frame, a member extending transversely of said frame in position to abut at least two of said standards, and a frangible connection between said member and said frame.

2. An agricultural machine comprising in combination, a frame, a plurality of standards adapted to carry earth-working implements at their lower ends, means pivotally mounting said standards at their upper portions in said frame, a member extending transversely of said frame rearwardly of said standards in position to abut the lower portions of the latter, and shear pins attaching the ends of said member to said frame.

3. An agricultural machine comprising in combination, a frame including upper and lower side rails interconnected by horizontal braces, a plurality of plows each including a vertically adjustable standard pivotally mounted on one of said upper horizontal braces, a heel pipe extending transversely between said lower side rails rearwardly of said standards including pairs of spaced, apertured ears extending from its opposite ends adapted to engage said lower side rails, and shear pins extending through the apertures in said ears and through corresponding apertures in said lower side rails.

ALBERT H. STOCKMAR.

REFERENCES CITED

The following references are of record in the file of this patent:

UNITED STATES PATENTS

| Number | Name | Date |
| --- | --- | --- |
| 337,400 | Heavner et al. | Mar. 9, 1886 |
| 407,766 | Avery | July 30, 1889 |
| 689,595 | Lindgren | Dec. 24, 1901 |
| 833,373 | De Moss | Oct. 16, 1906 |
| 1,000,262 | Harrington | Aug. 8, 1911 |
| 1,635,442 | Sigurd | July 12, 1927 |